United States Patent [19]

Kuroiwa

[11] Patent Number: 5,581,311
[45] Date of Patent: Dec. 3, 1996

[54] IMAGE STORAGE SYSTEM FOR A DIGITAL STILL CAMERA

[75] Inventor: Toshihisa Kuroiwa, Miura, Japan

[73] Assignee: Nikon Corporation, Tokyo, Japan

[21] Appl. No.: 506,004

[22] Filed: Jul. 24, 1995

[30] Foreign Application Priority Data

Jul. 22, 1994 [JP] Japan ................................ 6-170801

[51] Int. Cl.[6] ...................................................... H04N 5/76
[52] U.S. Cl. ........................................... 348/231; 348/233
[58] Field of Search ........................................ 348/222, 231, 348/233; 358/909.1; H04N 5/76, 5/228

[56] References Cited

U.S. PATENT DOCUMENTS

5,153,729  10/1992  Saito ........................................ 348/232
5,164,831  11/1992  Kuchta ..................................... 348/233

Primary Examiner—John K. Peng
Assistant Examiner—Sherrie Hsia

[57] ABSTRACT

A digital still camera having increased operation speed without substantial cost increases. The digital still camera is provided with an imaging unit which outputs image signals indicative of a frame of a subject, a temporary storage unit which accumulates the image signals, a storage unit having a storage area for the image signals, the storage area being organized by an area control system, an area control unit which drives the imaging unit and the temporary storage unit for each frame and concurrently identifying a free storage area in the storage unit, and a recording control unit which records header information indicating a type of the image signals, the recording control unit recording the image signals accumulated in the temporary storage unit into the identified free storage.

20 Claims, 8 Drawing Sheets

IMAGE STORAGE SYSTEM FOR A DIGITAL STILL CAMERA

BACKGROUND OF THE INVENTION

1. Field of the Invention

The present invention relates to a digital still camera which converts a subject image into a digital code and records the digital code in a recording medium

2. Description of the Related Art

In recent years, image processing technology has progressed greatly, and AV (audio visual) equipment to which that technology has been applied is becoming less expensive and more widely diffused. In still cameras, whose goal has conventionally been to take hard copy photographs, them is a demand to be able to exchange image information with known AV equipment. Thus, it is advantageous that the practical application and commercialization of digital still cameras, which can interface with known AV equipment, be developed.

Figure 5:
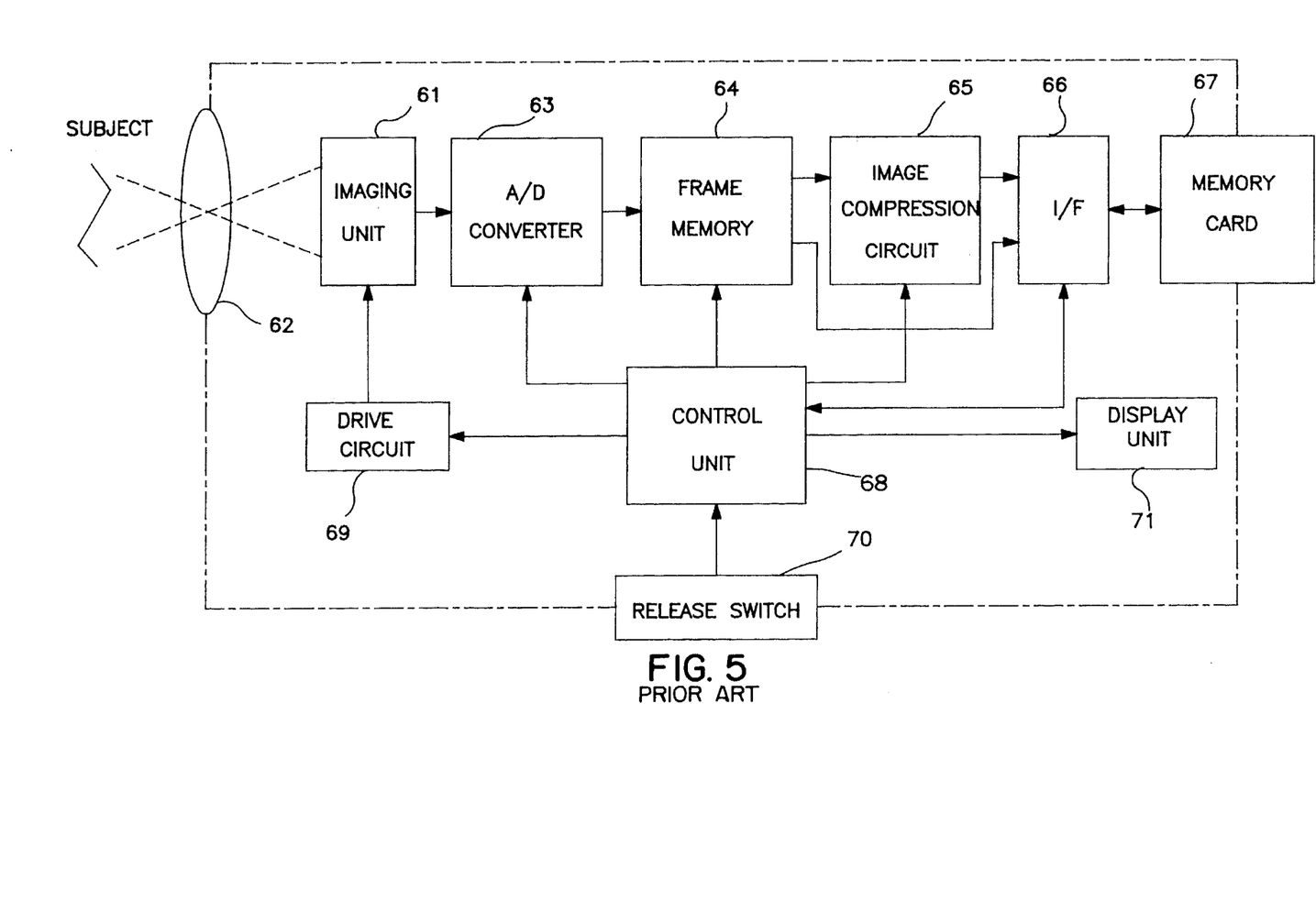
FIG. 5 is a block diagram of a conventional digital still camera.

FIG. 5 is a block diagram of a conventional digital still camera. An imaging unit 61 consists of fixed imaging element, such as a CCD located in a subject image forming plane generated by a lens 62. The output of the imaging unit 61 is connected to a bus terminal of a memory card 67 via an A/D converter 63, a frame memory 64, an image compression circuit 65, and an interface circuit (I/F) 66. The image compression circuit 65 is formed by LSI which conforms to the JPEG system. The memory card 67 preferably comprises a semiconductor memory. First through fourth outputs of a control unit 68 are respectively connected to a control input of the A/D converter 63, the frame memory 64, the image compression circuit 65, and the interface circuit (I/F) 66. A fifth output of the control unit 68 is connected to a control input of the imaging unit 61 via a drive circuit 69. The contact of a release switch 70 is connected to an input of the control unit 68. A sixth output of the control unit 68 is connected to an input of a display unit 71. The display unit 71 comprises a liquid crystal or other display element. In the conventional digital still camera, when the release switch 70 is half pressed, a driving power is supplied to the interface circuit (I/F) 66, the control unit 68 and the memory card 67 via a power source control circuit (not shown). The control unit 68 generally comprises software which controls the procedure for performing multiple unit control of the various component, a processor (not shown) which executes that software, and clock and timing signal generation circuits (not shown) which are input/output devices of the processor.

Figure 6:
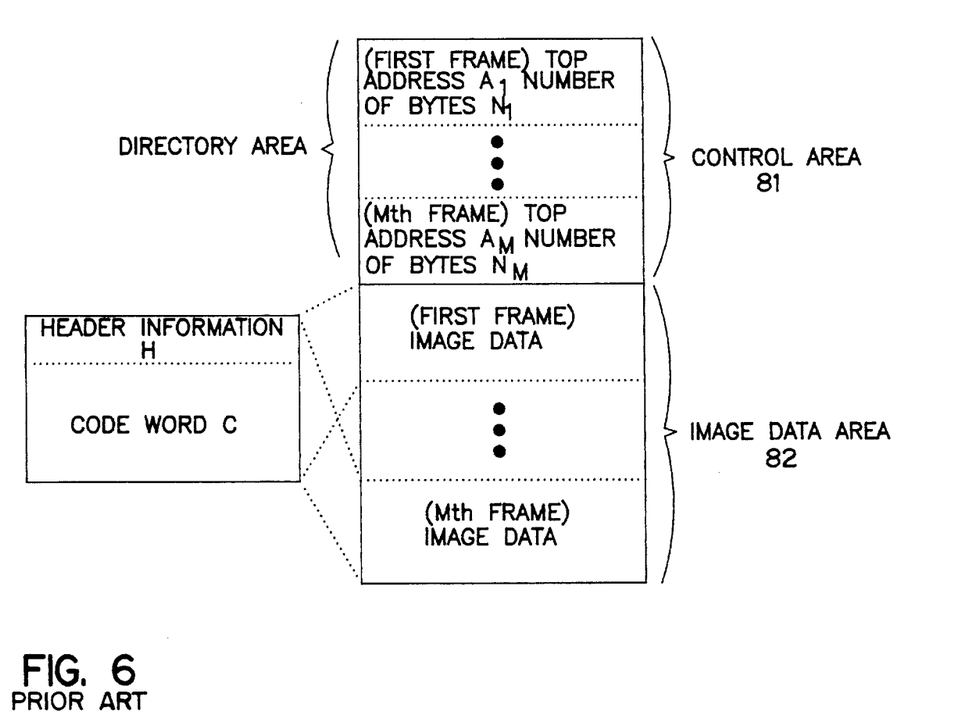
FIG. 6 is a diagram of the memory in a memory card for use in a conventional digital still camera.

FIG. 6 is a diagram of the memory in a memory card for use in a conventional digital still camera. In conventional digital still cameras, the storage areas of the memory card 67 comprise a control area 81 and an image data area 82. The image data area 82 is located adjacent to the control area, The storage areas are under the control of software which is executed by the control unit 68. A directory information array $(A_1, N_1)$–$(A_M, N_M)$, which indicates the top address A of the storage area of the image data area 82 the size (shown by the number of bytes) N of the storage area (adjacent in the address space), are located in the control area 81 and are assigned for each photographed frame (indicated here by frame numbers "1"–"M"). This type of directory information storage area corresponding to each frame is referred to below as a "directory entry."

The image data area 82 stores a number of pixels, a number of bits of image data, a compensation coefficient for gamma compensation, a header information H which indicates the presence or absence of compression encoding as well as other factors, and an image data array $(H_1, C_1)$–$(H_M, C_M)$ which indicates the code word C which corresponds to the header information. The header information H includes various data according to the compression encoding system employed and to the presence or absence of the type of compression encoding. For example, when a JPEG system is employed, a number of color components, a number of pixels, a number of bits of image data, a quantization table, a Huffmann table, and a compression mode are included. Moreover, when recording into the image data area 82 is performed based on TIFF (Tag Image File Format), without employing a compression encoding system, data based on the number of pixels, a number of bits of image data, subsampling information, a color change coefficient, a whiteness level, a blackness level, and other tag systems are included in the header information. The memory card 67, which is the recording medium, must undergo initialization (also known as "formatting") when it is first used. In the process of initialization, all of the contents of the arrays $(A_1, N_1)$–$(A_M, N_M)$ and $(H_1, C_1)$–$(H_M, C_M)$ are set to "0".

The conventional digital still camera starts operations through operation of the release switch 70 (see FIG. 5). When the contact of the release switch 70 is closed halfway, driving power is supplied to the control unit 68, the interface circuit (I/F) 66, the memory card 67 and other components. The control unit 68 obtains the number of frames remaining r and outputs r to the display 71.

Figure 7:
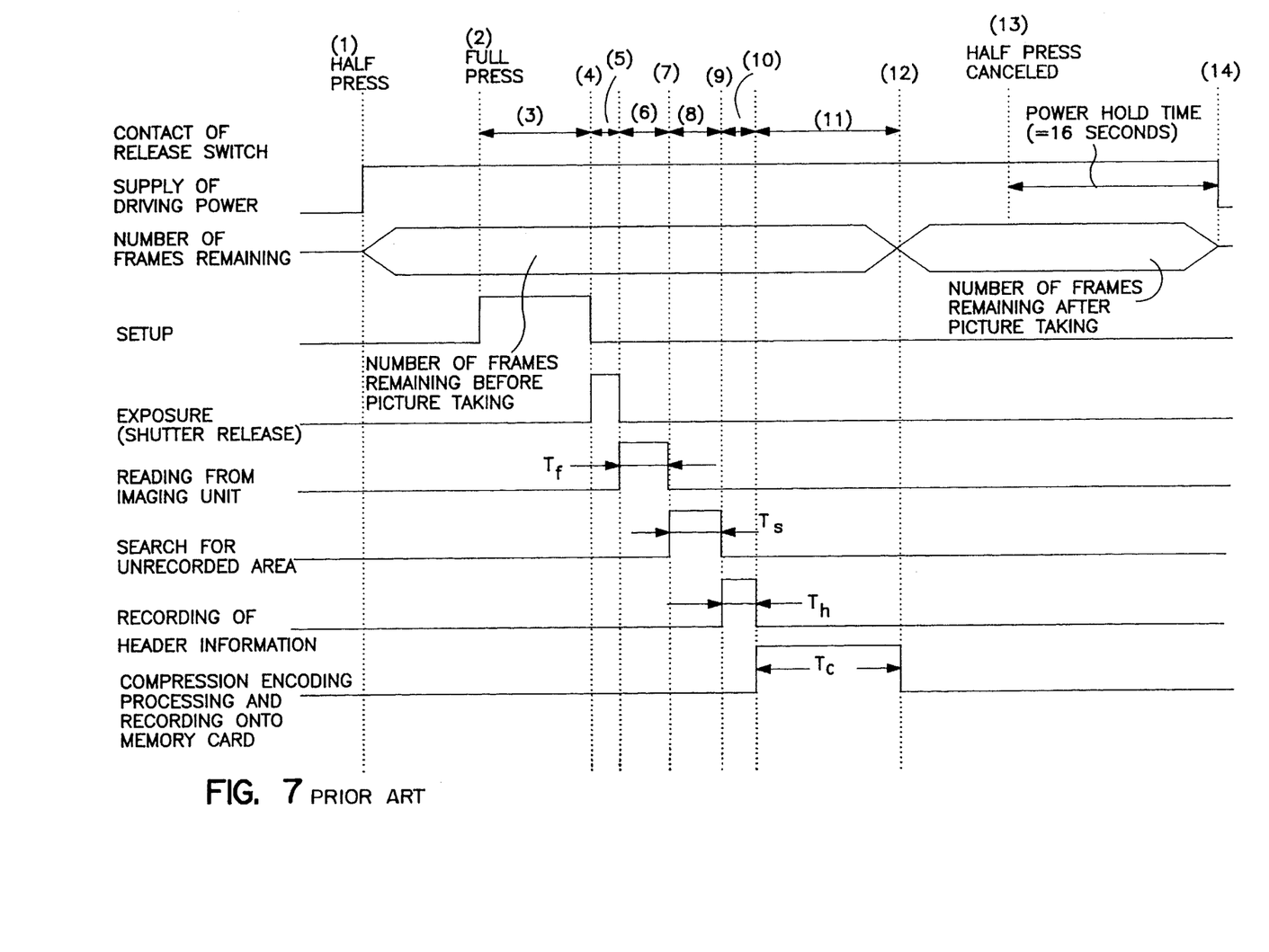
FIG. 7 is a timing diagram of a processing procedure in a conventional digital still camera.

FIG. 7 is a timing diagram of a processing procedure in a conventional digital still camera. The operating procedure starts at time (1) upon the half press of the release switch (see FIG. 5). The control unit 68 (see FIG. 5) monitors the status of the contact of the release switch 70, and when the contact has been completely closed at time (2), a determination is made as to whether the number of frames remaining is "0". When the number of frames remaining is not "0", photography is possible, and driving power is supplied to the imaging unit 61 via the drive circuit 69 at a timing which has been set in advance. Power is also supplied to the A/D converter 63, the frame memory 64, and the image compression circuit 64.

Moreover, as the control unit 68 stands by until each of the components becomes operational, it starts photographic operations after a setup period, time (3). During the setup period, parameters such as the quantization table and Huffmann table, are initialized. The setup period is determined according to the rise response of each component, and is generally 100 ms. Therefore, in conventional digital still cameras, various means are used to shorten the time lag from when the release switch 70 is fully pressed until shutter is released.

Thereafter, the control unit 68 drives the shutter (not shown) at a specified shutter speed at time (4). The optical image of the subject, obtained via the lens 62 and an aperture (not show), undergoes a specified optical processing and is sent to the imaging unit 61.

Image signals are generated in the imaging unit 61 while the optical image is photoelectrically converted and stored. The image signals undergo amplification, white balance, γ (gamma) processing, and other signal processing in a built-in signal processing circuit (not shown). The resultant signals are generated as analog image signals at times (5) through (6). The timing in which image signal is generated from the imaging unit 61 is delayed with respect to the imaging unit's time of exposure completion, since the timing is set to be synchronized with the vertical synchronization signals of the imaging unit 61. Therefore, the imaging unit 61 holds the delay to a minimum by synchronizing shutter release with the vertical synchronization signals and by initializing the phase of the vertical synchronization signals at the time of the completion of exposure.

The A/D converter 63 sequentially converts the analog image signals into digital signals which are stored in the frame memory 64 at time (6). At time (7) the control unit 68 recognizes that all of the digital signals which constitute one corresponding frame have been stored in the frame memory 64. Thereafter, at time (8), the control unit 68 accesses the memory card 67, searches among the arrays, $(A_1, N_1) \sim (A_M, N_M)$ and $(H_1, C_1) \sim (H_M, C_M)$, stored in the control area 81 for top addresses A and sizes N, which have values equivalent to the initial value "0". When elements which conform to this condition are found, at time (9), the control unit 68 obtains the top address $A_n$ of the unrecorded area of the image data area 82 by performing an arithmetic operation on the pointer (which is "n" here in the interest of simplicity), which indicates those elements, for the corresponding array according to the equation:

$$A_n = A_{n-1} + N_{n-1},$$

The controller generates header information, based on settings performed by the photographer and other contents, concurrently with photographing of the corresponding frame. The controller then writes the header information to an area which starts with top address $A_n$ in the address space at time (10). There are cases where this header information is automatically generated through an LSI for the JPEG system compression computation, which is built into the image compression circuit 65, but in the interest of simplicity, this type of LSI is not explained herein.

When header information is written in this way, by starting the image compression circuit 65 and controlling the DMA controller, which is built into the control unit 68, the control unit 68 sequentially records the code generated from the image compression circuit 65 from the address indicated by the sum of the size h of that header information (given in advance based on the type of header information) and the top address $A_n$.

Because the processing algorithm is complicated, the inequality $$T_c T_f$$

is generally established between the required time $T_c$ for computation and the required time $T_f$ (for example, this is 30 ms with an imaging section driven according to the NTSC method) for reading by the imaging unit 61. Therefore, the image signals which have been read from the imaging unit 61 and digitized are stored all at once in the frame memory 64. Moreover, the image compression circuit 65 reads the image signals, stored concurrently in the frame memory 64, and executes a specified image compression processing at a maximum processing speed for the image compression circuit. Therefore, the frame memory 64 functions as a buffer memory which absorbs the difference between the time for reading the image signals from the imaging unit 61 (signal processing circuit) and the processing speed of the image compression circuit 65. The DMA controller writes the code, generated by the image encoding circuit 65, into the area which starts from the address using the interface circuit (I/F) 66 at time (11).

When the control unit 68 recognizes that the end word of the code has been written in the unrecorded area, the control unit 68 writes, $A_n$, which is indicated by the above equation, as the top address A in the array $(A_1, N_1) \sim (A_M, N_M)$ which corresponds to the pointer value n for the control area 81. The operation of photographing the corresponding frame is completed by writing the size of the code estimated at time (12) as size N.

The control unit 68 calculates the number of frames remaining r, after completing the photographic operation, by performing an arithmetic computation based on the equation $$r = M - n$$

r=the integer portion of (remaining capacity of the unrecorded area/code length per frame). At time (12) the control unit 68 outputs the number of frames remaining to the display 71. The number of frames photographed, the shutter speed, the aperture value and other information are also displayed on the display 71, but explanations of these display items are omitted.

In the conventional example, the storage area of the memory card 67 comprises the control area 81 and the image data area 82, as shown in FIG. 6. Control of these areas, assigned to the code generated from the image compression circuit 65, is performed under the control of the control unit 68. However, the types of area control systems shown in FIGS. 8 and 9, for example, have also been proposed.

Figure 8:
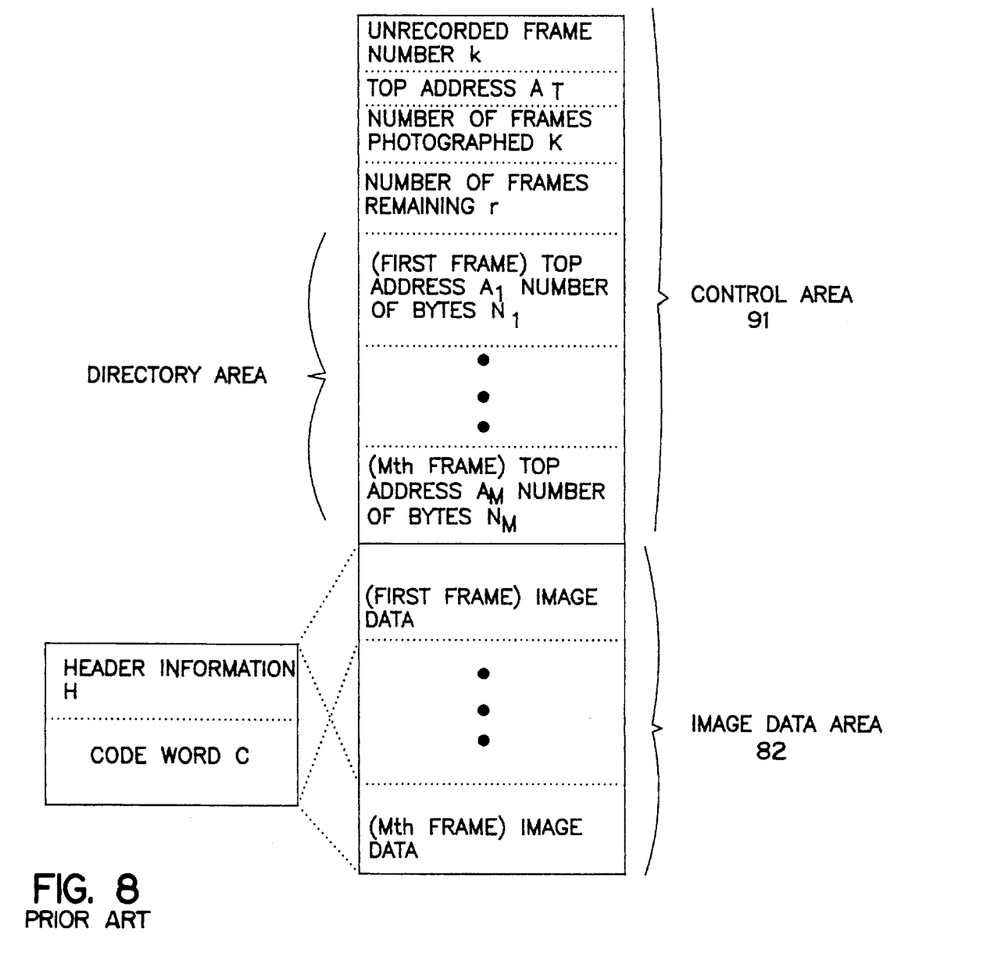
FIG. 8 is a diagram of the memory in an alternative memory card for use in a conventional digital still camera.

FIG. 8 is a diagram of the memory in an alternative memory card for use in a conventional digital still camera. The area control system shown in FIG. 8 has the same image data area configuration as that shown in FIG. 6, but in addition to a directory area in which the array $(A_1, N_1) \sim (A_M, N_M)$ is located, the control area 91 comprises storage areas for an unrecorded frame number k which indicates the frame to be photographed next, a top address $A_T$ of the unrecorded area in the image data area 82, a number of frames photographed K which indicates the total of the frames already photographed, and a number of frames remaining r. It is not necessary for the control unit 68 to set the contents of the directory area and the image data area 82 to "0" during initialization. Instead the control unit 68 may set the unrecorded frame number k to "1" in order to set the top address $A_T$ of the unrecorded area to the top address of the image data area 82 while setting the number of flames photographed K to "0" and setting the number of frames remaining r to "M" or some small number of frames remaining based on the size of the remaining unrecorded area.

When the image data area 82 is assigned to the code generated by the image compression circuit 65, the control unit 68 obtains the top address $A_T$ of the unrecorded storage area without searching the directory area for entries with sizes N which are "0." Next, as the control unit 68 incrementally changes the unrecorded frame number k, and the number of flames photographed K at the time when the end word of that code is stored, the sum of the code word length written in the image data area is added to the word length h of the header information for the top address A of the unrecorded area. Thereafter, the control unit 68 updates the number of frames remaining r. Thus, it is possible to photograph subsequent frames in the same way. Data is stored in the control area 91, so even if the driving force of the control unit 68 is interrupted, in conjunction with the operation of the release switch 70 through picture-taking, data is reliably maintained and supplied for subsequent frames.

Therefore, the processing required for initialization and for photographing each frame is shortened, and while reducing the scale of the software. Additionally, the speed of photographic preparations which accompany such operations as replacement of the memory card 67 and of the photography of each frame is increased. Also, when the storage capacity of the memory card 67 is large, the required computation time for searching the directory area for cases where the size N is "0" is greatly reduced, and photographic operations are more efficient.

Figure 9:
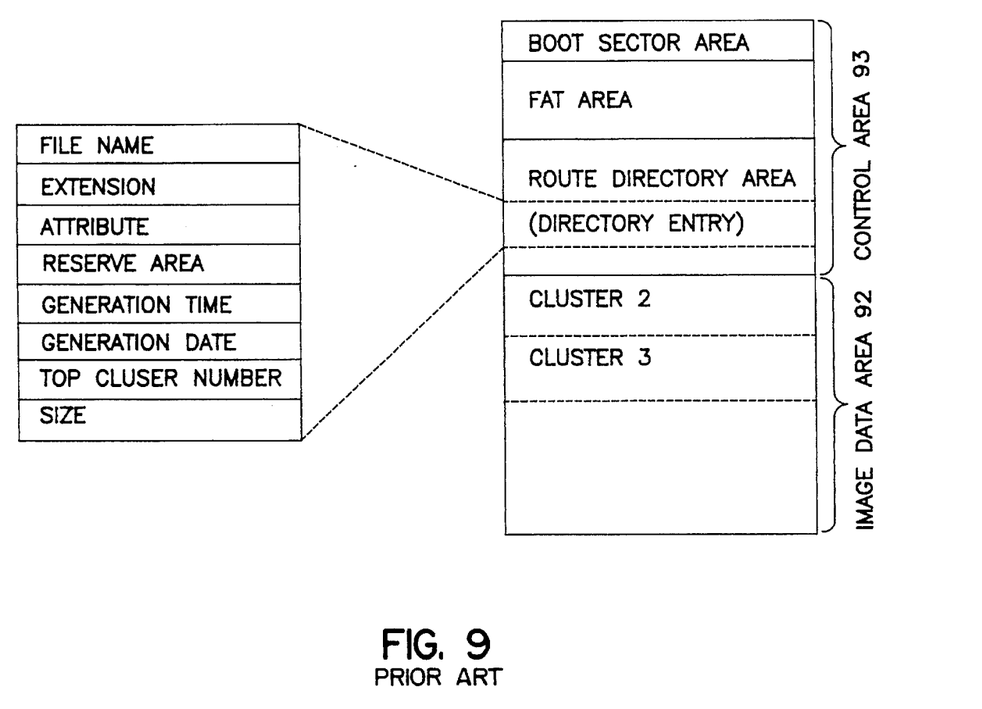
FIG. 9 is a diagram of the memory in an alternative memory card for use in a conventional digital still camera.

FIG. 9 is a diagram of the memory in an alternative memory card for use in a conventional digital still camera. A file organization which is compatible with the MS-DOS file system is employed, and the image data area 92, used in place of the image data area 82, comprises multiple clusters (blocks) partitioned for each specific size (for example, 1024 bytes) in the address space. The control area 93, corresponding to the control areas 81 and 91, comprises a FAT (file allocation table) area, a route directory area, and a boot sector area.

The FAT area consists of a set of FAT entries comprising small areas which individually correspond to the multiple clusters. Each FAT entry constitutes a chain information (map information) storage area forming an adjacent area which corresponds to each frame by logically connecting the corresponding clusters with other clusters.

The route directory area comprises a set of directory entries which correspond to each frame, along with an eight-byte-long file name which identifies the file in which the image data of the corresponding frame is stored, and a three-byte-long extension which is added to the file name, for the corresponding file. Each directory entry comprises storage areas for a one-byte-long attribute, a ten-byte-long reserve area, a two-byte-long generation time, a two-byte-long generation date, a two-byte-long top cluster number which indicates the top cluster in which image information is stored, and a four-byte-long size.

The boot sector area is reserved as a storage area for basic parameters which correspond to the MS-DOS file system.

In this case it is not necessary for the control unit 68 to set the contents of the image data area 92 to "0" during initialization. During initialization, while parameters, which have been set in advance according to the file organization which are to be applied in the digital still camera, are stored in the boot sector area, the FAT area is set to a status in which all of the chain information is canceled, and all directory entries in the route directory area may be set to a status in which no files are registered.

When the image data area is assigned to the code, generated by the image compression circuit 65 (see FIG. 5), the control unit 68 first searches the directory entries located in the route directory for cases where files are not registered. Moreover, the control unit 68 searches the FAT entries located in the FAT area for cases where no linking relationship is registered with any cluster, based on the format of the chain information, and reads the corresponding cluster number as the top cluster number of the corresponding directory entry, at times (7) and (8) in FIG. 7. When the generation of header information for the corresponding frame is completed, the control unit 68 sequentially writes the header information into the corresponding cluster, at times (9) and (10) in FIG. 7. The control unit 68 writes a code, which is given by the image compression circuit 65, into the remaining area of the corresponding cluster. When the corresponding cluster is full, as the control unit 68 searches for other empty clusters and assigns them to subsequent code words based on the chain information, the control unit 68 registers information which indicates the logical connection between the corresponding cluster and the preceding cluster as chain information and repeats the processing, at time (11) in FIG. 7.

When the control unit 68 recognizes that the last word of the code of the corresponding frame has been stored, the control unit 68 writes the identification information of the corresponding frame in the file name and extension from among the directory entries searched in advance, at time (12) in FIG. 7. The control unit 68 writes the file attribute which corresponds to the frame for the attribute, and reads the date and time at that point from a calendar clock (not shown, but built into the digital still camera) at that point and writes the date and time as the generation time and generation date. The control unit 68 also writes the header information and total word length of the code as the size. It is possible to exchange image data between a personal computer, which is able to access the memory card 67, under a file system which is compatible with MS-DOS, and other data terminals. The image data of each frame is handled as an independent file.

In this example, assignment of directory entries and updating of FAT entries is performed in the order of the frames photographed, but for newly photographed frames, the memory card 67 has the image data already recorded in its storage area edited by means of the normal file system. When the memory card 67 is again installed into the digital still camera, the new image data is reliably recorded within the range of the storage capacity.

In these examples, the code generated by the image compression circuit 65 is recorded onto the memory card 67, no matter what area control system is employed. However, when a compression encoding system is not employed, the output of the frame memory 64 is given directly to the memory card 67 without going through the image compression circuit 65. Recording into the memory card 67 is generally performed at a high speed under the control of the DMA controller, with the exception of the header information, so the timing and length of the period during which the recording takes place varies according to whether there is compression encoding.

In the conventional digital still camera, when the address exceeded the last address of the image data areas 82 and 92, when writing of the image data into the assigned area is performed, the control unit 68 recognizes the overflow of image data, generates an error display to that effect on the display 71, and interrupts the photographic operation. Between the time when all of the digital image signals have been stored in the frame memory 64 and the time when the image compression circuit 65 reads those digital signals, a delay occurs which results from the time the control unit 68 requires for computation, the response time of the image compression circuit 65, and other factors. However, this delay time is generally sufficiently short in comparison to the time $T_f$ the imaging unit 61 requires for reading and the time required for image encoding processing.

In conventional digital still cameras, the control unit 68 supplies driving power when the memory card 67 is replaced, but the driving power of the controller, the interface circuit (I/F) 66 and the memory card 67 is supplied by a power source control circuit (not shown) when the release switch 70 is in the half-pressed status. The control unit 68 starts up through the supply of the driving power, and performs the above described processing. When the contact of the release switch 70 returns to the off status, a timer, which is of a specified duration (for example, 16 seconds), is started, at time (13) in FIG. 7. The timer provides the timing for the interruption of the supply of driving power to the power source control circuit, at time (14) in FIG. 7.

In the conventional digital still camera, the control unit 68 searches, at time (7) through (8) in FIG. 7, for an unrecorded area of image data areas 82 (or 92) after the digital image signals for one frame have been stored in the frame memory 64, at time (2) through (6) in FIG. 7. The control unit 68 holds the processing, by which the code generated by the image compression circuit 65 (or the image information stored in the frame memory 64) is recorded onto the memory card 67, until the recording of header information, at times (9) through (10) in FIG. 7, into the unrecorded area is completed. However, due to factors in the processing involved in searching for this unrecorded area, the computation processing time is increased and photographic efficiency is decreased as the storage area of the memory card 67 grows and the number of frames stored on the memory card increase. Such time increase is particularly noticeable when the area control system shown in FIG. 9 is employed, even though the computation speed of the microprocessor built into the control unit 68 is limited due to demands for compactness and reductions in power consumption, because the FAT entries are accessed by repeating a bit computation command which requires a great amount of computation time. Moreover, there is a large possibility that the required computation time further increases with attempts to increase the storage capacity of the memory card 67 as prices are reduced through technological advances. Processing for recording the header information is performed at speeds much lower than those where the unrecorded area is accessed via a DMA controller built into the control unit 68, because the header information is generated and recorded under the control of software executed by the control unit 68. Therefore, a required time $T_S$ for unrecorded area search processing and a required time $T_h$ for header information recording processing are large factors in delaying the photography time.

SUMMARY OF THE INVENTION

Accordingly, it is an object of the present invention to provide a digital still camera which having increased operation speed with a minimal cost increase.

Additional objects and advantages of the invention will be set forth in unit in the description which follows, and, in unit, will be obvious from the description, or may be learned by practice of the invention.

The above objects of the present invention are achieved in a digital still camera comprising an imaging unit which optically captures the subject, performs photoelectric conversion, and generates image signals which indicate the subject, a temporary storage unit which accumulates the image signals, a storage unit which forms a storage area for the image signals based on a predetermined area control system, an area control unit which drives the imaging unit and the temporary storage unit for each frame and concurrently searches for free storage area in the storage unit based on the area control system, and a recording control unit which records header information indicating the type of image signals, and image signals which have accumulated in the temporary storage unit, into the free storage area found by the area control unit.

Objects of the present invention are also achieved in a digital still camera comprising an imaging unit, which optically captures the subject, performs photoelectric conversion, and generates image signals which indicate the subject, a temporary storage unit which accumulates the image signals, a storage unit which forms a storage area for the image signals based on a predetermined area control system, an area control unit which drives the imaging unit and the temporary storage unit for each frame and concurrently searches for free storage area in the storage unit based on the area control system in order to record header information which shows the type of image information, and a recording control unit which records the image signals which have accumulated in the temporary storage unit into the area from among the free storage area found by the area control unit which is adjacent to the area into which the header information was recorded.

Objects of the present invention are achieved in a digital still camera comprising an imaging unit which optically captures the subject, performs photoelectric conversion, and generates image signals which indicate the subject, a temporary storage unit which accumulates the image signals generated by the imaging unit, an image encoding unit which handles the image signals accumulated by the temporary storage unit, executes encoding processing for each frame, and generates code, a storage unit which forms a storage area for the code generated by the image encoding unit based on a predetermined area control system, an area control unit which drives the imaging unit and the temporary storage unit for each frame and concurrently searches for free storage area in the storage unit based on the area control system, and a recording control unit which records header information, which indicates the type of image signals, and the code generated by the image encoding unit into the free storage area found by the area control unit.

Objects of the present invention are also achieved in a digital still camera comprising an imaging unit which optically captures the subject, performs photoelectric conversion, and generates image signals which indicate the subject, a temporary storage unit which accumulates the image signals generated by the imaging unit, an image encoding unit which handles the image signals accumulated by the temporary storage unit executes encoding processing for each frame, and generates code, a storage unit which forms a storage area for the code generated by the image encoding unit based on a predetermined area control system, an area control unit which drives the imaging unit and the temporary storage unit for each frame and concurrently searches for free storage area in the storage unit based on the area control system in order to record header information which indicates the type of image information, and a recording control unit which records code generated by the image encoding unit into the area, from among the free storage area found by the area control unit which is adjacent to the area where the header information was recorded.

Objects of the present invention are also achieved in a digital still camera comprising a storage area for each frame formed by a storage unit comprising a control area, in which control information which conforms to an area control system is to be stored, and an image data area in which the code or image information is to be stored.

Objects of the present invention are also achieved in a digital still camera comprising a storage area formed by predetermined file organization files and by a file control system which conforms to the file organization being employed as the area control system.

Objects of the present invention are also achieved in a digital still camera having a file organization compatible with the MS-DOS file system and a file control system conforming to the MS-DOS file system.

Objects of the present invention are also achieved in a digital still camera comprising an imaging unit which outputs image signals indicative of a frame of a subject, a temporary storage unit which accumulates the image signals, a storage unit having a storage area for the image signals, the storage area being organized by an area control system, an area control unit which drives the imaging unit and the temporary storage unit for each frame and concurrently identifying a free storage area in the storage unit, and a recording control unit which records header information indicating a type of image signals, said recording control unit recording image signals accumulated in the temporary storage unit into the identified free storage.

Objects of the present invention are also achieved in a digital still camera comprising an imaging unit which outputs image signals indicative of a frame of a subject, a temporary storage unit which accumulates the image signals, a storage unit having a storage area for the image signals, the storage area being organized by an area control system, an area control unit which drives the imaging unit and the temporary storage unit for each frame and concurrently identifies a free storage area in the storage unit to record header information indicating a type of the image information, and a recording control unit which records the image signals accumulated in the temporary storage unit into the identified free storage area adjacent to the area into which the header information was recorded.

Objects of the present invention are also achieved in a digital still camera comprising an imaging unit which outputs image signals indicative of a frame of a subject, a temporary storage unit which accumulates the image signals, an image encoding unit which encodes the image signals accumulated by the temporary storage unit and generates a code, a storage unit having a storage area for the code, the storage area being organized by an area control system, an area control unit which drives the imaging unit and the temporary storage unit for each frame and concurrently identifies a free storage area in the storage unit, and a recording control unit which records header information indicating a type of the image signals, said recording control unit storing the code into the identified free storage area.

Objects of the present invention are also achieved in a digital still camera comprising an imaging unit which outputs image signals indicative of a frame of a subject, a temporary storage unit which accumulates the image signals, an image encoding unit which encodes the image signals accumulated by the temporary storage unit and generates a code, a storage unit having a storage area for the code, the storage area being organized by an area control system, an area control unit which drives the imaging unit and the temporary storage unit for each frame and concurrently identifies a free storage area in the storage unit to record header information which indicates a type of the image information, and a recording control unit which records the code into the identified free storage area adjacent to where the header information was recorded.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
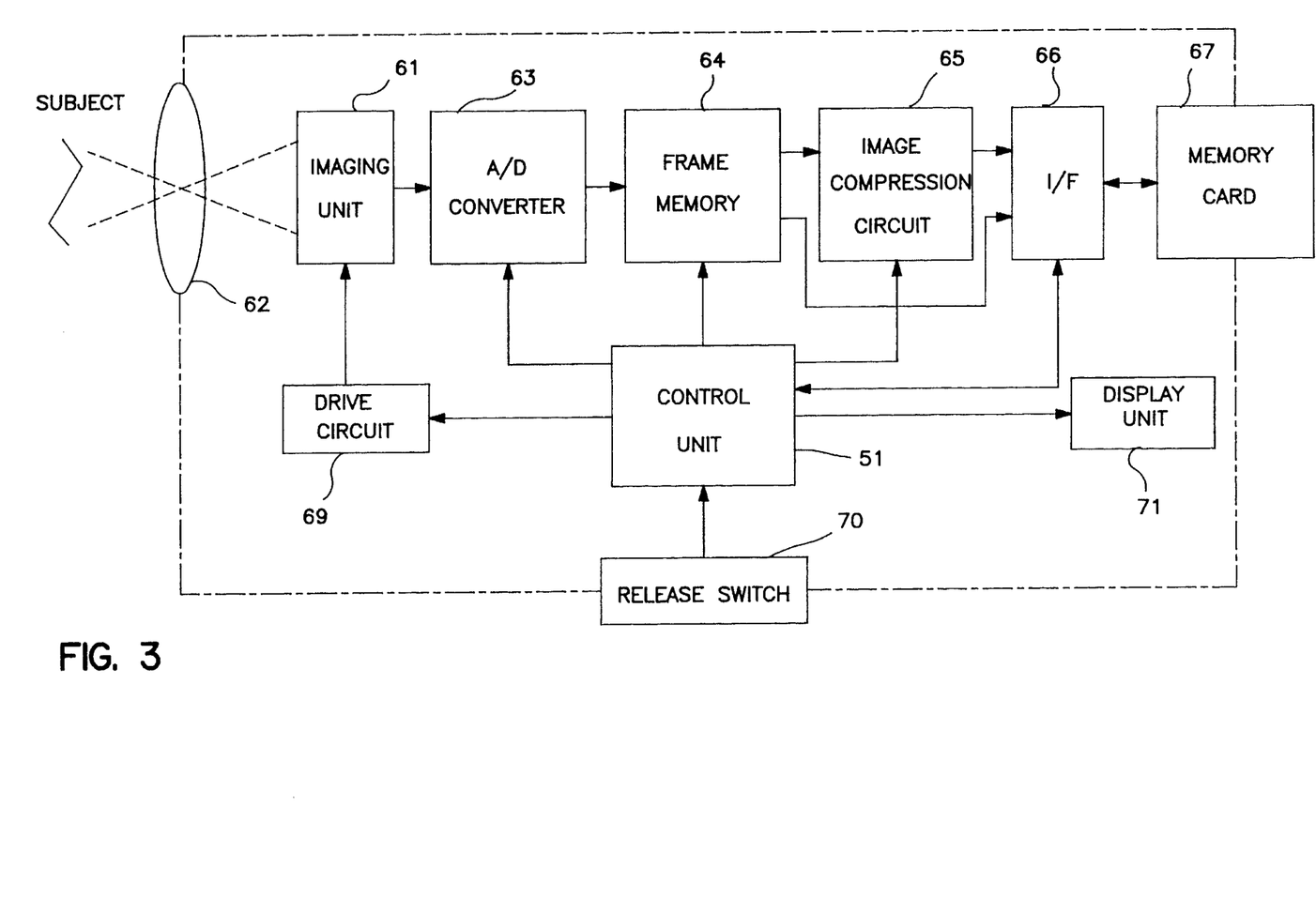
FIG. 3 is a structural block diagram of a digital still camera in accordance with the preferred embodiments of the present invention.

FIG. 3 is a structural block diagram of a digital still camera in accordance with the preferred embodiments of the present invention. In general, the structural, or hardware, configuration differs from the conventional digital still camera as shown in FIG. 5 in that the digital still camera in accordance with the preferred embodiments is equipped with a control unit 51 instead of a control unit 68.

Figure 1:
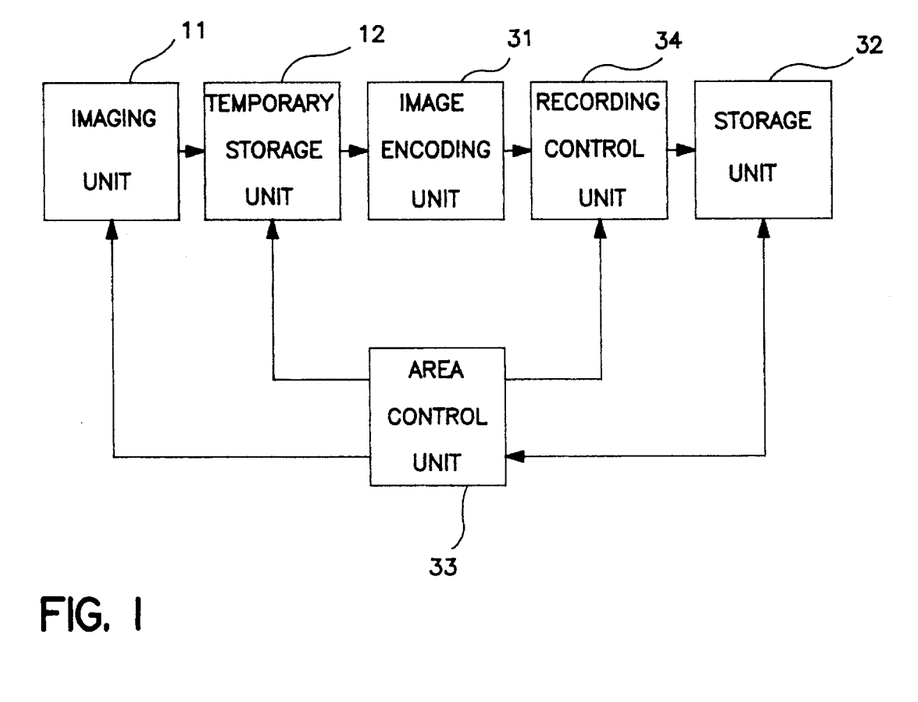
FIG. 1 is a logical block diagram of a digital still camera in accordance with a first preferred embodiment of the present invention.
Figure 2:
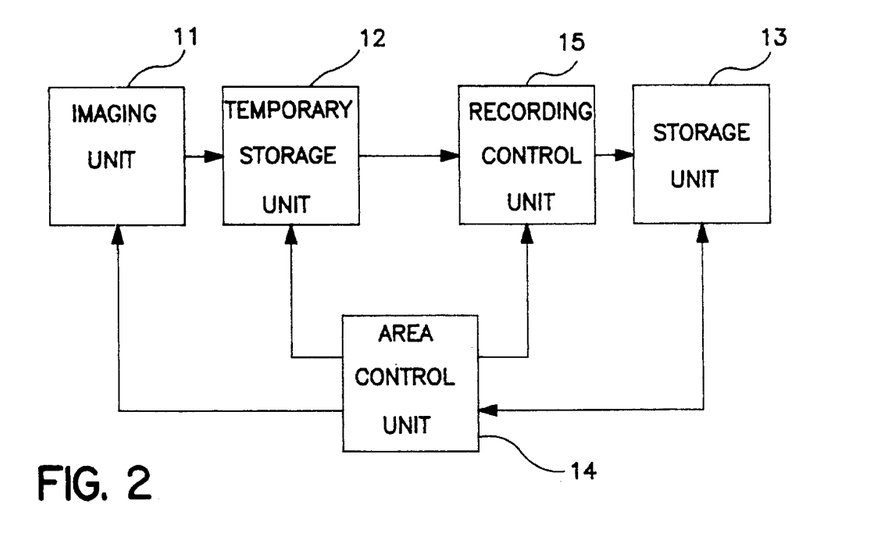
FIG. 2 is a logical block diagram of a digital still camera in accordance with a second preferred embodiment of the present invention.

FIGS. 1 and 2 are logical block diagrams of digital still cameras in accordance with a first and second preferred embodiment of the present invention, respectively, which can be practiced on the structure set forth in FIG. 3. In general, the lens 62, the imaging unit 61, the A/D converter 63 and the drive circuit 69 correspond to a imaging unit 11; the frame memory 64 corresponds to a temporary storage unit 12; the image compression circuit 65 corresponds to an image encoding unit 31; the memory card 67 corresponds to storage units 13 and 32; the control unit 51 corresponds to area control units 14 and 33; and the control unit 51 and the interface circuit (I/F) 66 correspond to recording control units 15 and 34.

Figure 4:
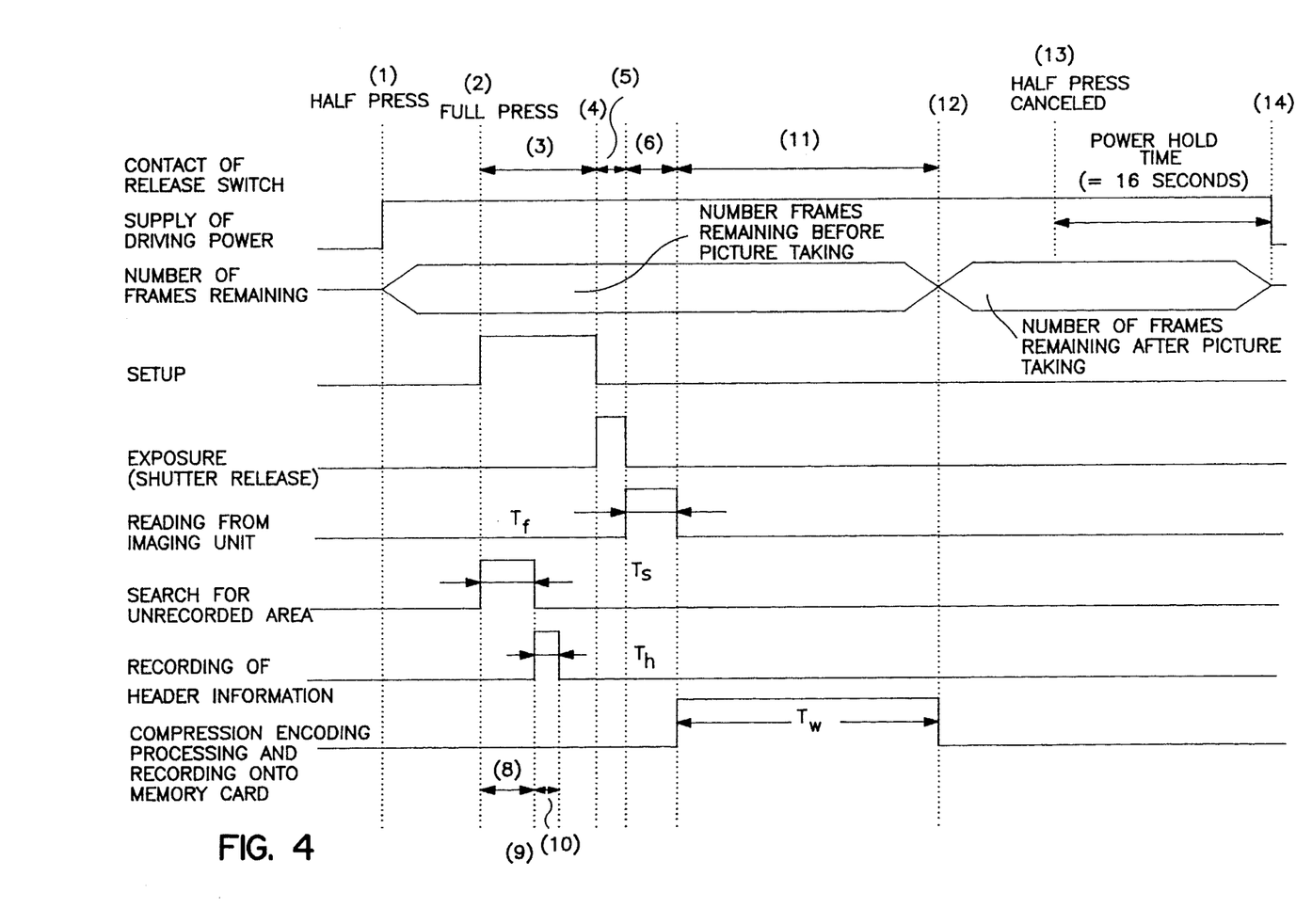
FIG. 4 is a timing chart of a processing procedure in a digital still camera in accordance with the preferred embodiments of the present invention.

FIG. 4 is a timing chart of a processing procedure in a digital still camera in accordance with the preferred embodiments of the present invention. In general, times (1) through (14) indicate timings at which the same processes and operations as the those of the operational timing chart of the conventional example shown respectively by times (1) through (14) in FIG. 7 are performed under the control of the control unit 51. Therefore, in the interest of simplicity, an explanation of the contents of these processes and operations is not included below.

FIG. 1 is a logical block diagram of a digital still camera in accordance with a first preferred embodiment of the present invention. When the area control unit 33 drives the imaging unit 11 and the temporary storage unit 12, the imaging unit 11 generates image signals, which indicate the subject, by optically capturing the subject and performing photoelectric conversion. The temporary storage unit 12 accumulates these image signals. While the imaging unit 11 and the temporary storage unit 12 are driven in this way, the area control unit 33 concurrently searches for the free storage area of the storage unit 32 based on the area control system to be applied to that storage unit. That is, while the image signals of the corresponding frame are accumulated in the temporary storage unit 12, a concurrent search for area which is free in the storage unit 32 is performed. Therefore, the header information, which shows the type of the image signals of the corresponding frame, and the code, which was generated by the image encoding unit 31 executing encoding processing on the image signals which have accumulated in the temporary storage unit 12, is more quickly and efficiently recorded into the storage unit 32 by the recording control unit 34.

Looking at the structural diagram in FIG. 3 and the timing diagram shown in FIG. 4, the area control system, as shown in FIG. 7, is employed in the storage area of memory card 67 under the software executed by the control unit 51. When the control unit 51 recognizes that the contact of the release switch 70 is fully closed at time (2), a determination is made as to whether the number of frames remaining at that time is "0". If the number of frames remaining is not "0", the control unit 51 recognizes that photography is possible, and power is supplied to the imaging unit 61 via the drive circuit 69, the A/D converter 63, the frame memory 64 and the image compression circuit 65 in order to perform setup processing at time (3). By accessing the memory card 67 concurrently with the setup processing, the control unit 51 searches, at time (8) for cases where the top address A and the size N are equivalent to an initial value of "0" in the array $(A_1, N_1) \sim (A_M, N_M)$, which is stored in the control area 81. Moreover, the control unit 51 also obtains the top address $A_n$ of the unrecorded area of the image data area 82 using:

$$A_n = A_{n-1} + N_{n-1}$$

on the pointer n which indicates that element for the corresponding array, at time (9).

At time (10), the control unit 51 generates header information and writes the header information into the unrecorded area adjacent to top address $A_n$ in the address space. That is, the unrecorded area where the image data of the corresponding frame is to be stored is maintained in the image data area 82, and header information is written in advance into the top section of that unrecorded area, so preparations for writing the code generated by the image compression circuit 65 are completed.

At time (4) and (5), the imaging unit 61 generates analog image signals by optically capturing the subject and executing the specified signal processing. At time (6), the A/D converter 63 sequentially converts the analog image signals into digital signals and stores them in the frame memory 64. When the accumulation of digital signals in the frame memory 64 is completed, the image compression circuit 65 generates code by sequentially reading the information accumulated in the frame memory 64 and executing image encoding processing. At time (11), the control unit 51 records the code generated by the image compression circuit 65 into the area which starts from the address indicated by the sum of the size h (obtained in advance by the type of header information) of the header information and the top address $A_n$, by controlling the DMA controller (not shown).

The operations from time (12) through time (14), after writing to the image data area 82, are the same as in the conventional example shown in at time (12) through time (14) in FIG. 7.

In this way, by changing the micro control sequence without changing the detailed processing procedure of the software of the controller, steps preceding the frame memory 64 and after the interface circuit (I/F) 66 are performed concurrently, and searching for the unrecorded area and recording of header information into the unrecorded area found is completed in the period from the start of setup processing until one frame of information is stored in the frame memory 64. Thus, the photography time is shortened.

Also, in the embodiment, the area control system shown in FIG. 8 may be employed in place of the area control system shown in FIG. 7. When this type of area control system is employed, during initialization, the control unit 51 sets the initial values of the number of unrecorded frames k, the top address $A_T$ of the unrecorded area, and the number of frames photographed K to "1". In addition, the control unit 51 sets the top address of the image data area 82 to "0" and the initial value of the number of frames remaining r to either "M" or the number of frames remaining obtained based on the size of the remaining unrecorded area, which ever is smaller.

When the image data area is assigned to the code generated from the image compression circuit 65, in the same way as in the conventional example, the control unit 51 obtains the top address $A_T$ of the unrecorded area without searching the directory area for cases where the size N is "0". The control unit 51 incrementally changes the unrecorded frame number k and the number of frames photographed K at the time when the end word of the code is stored in the unrecorded area. Additionally, the control unit 51 updates the unrecorded frame number k and the number of frames photographed K by adding the sum of the code word length written in the image data area and the word length h of the header information for the top address A of the unrecorded area. Thereafter, the control unit 51 updates the number of frames remaining r.

Therefore, as the processing required for initialization and for photographing each frame is simplified, the scale of the software of the control unit 51 is reduced. The photographic preparations, which accompany replacement of the memory card 67, and the photographing of each frame can be performed faster. Moreover, when the storage capacity of the memory card 67 is large, the time required to search the directory area for cases where the size N is "0" is greatly reduced, making photographic operation more efficient.

Although the first embodiment of the present invention has been described with respect to a specific configuration, it will be recognized that the first embodiment is not limited to the specific configuration.

FIG. 2 is a logical block diagram of a digital still camera in accordance with a second preferred embodiment of the present invention. When the area control unit 14 drives the imaging unit 11 and the temporary storage unit 12, the imaging unit 11 generates image signals, which indicate that subject, by optically capturing the subject and performing photoelectric conversion. The temporary storage unit 12 accumulates these image signals. Concurrently, the area control unit 14 concurrently searches for the free storage area of the storage unit 13 based on the area control system to be applied to that storage unit. In other words, while the image signals of the corresponding frame are being stored in the temporary storage unit 12, there is a concurrent search for the area which is free in the storage unit 13. Therefore, the header information, which shows the type of the image signals of the corresponding frame, and the image signals, which are accumulated in the temporary storage unit 12, are quickly and efficiently recorded into the storage unit 13 by the recording control unit 15.

Alternatively, while the imaging unit 11 and the temporary storage unit 12 are being driven, the area control unit 12 concurrently searches for the free storage area of the storage unit 13, based on the area control system to be applied to that storage unit, and also records the header information, which indicates the type of the image signals, into the free storage area. That is, while the image signals of the frames which correspond to the temporary storage unit 12 are accumulated, processing for a search for the area which is free in the storage unit 13 at that point and processing for recording the header information in that area are concurrently performed. Therefore, the image signals, accumulated in the temporary storage unit 12 for the corresponding frame, are more quickly and efficiently recorded into the storage unit 13 by the recording control unit 15.

Looking at the structural diagram in FIG. 3, the output of the frame memory 64 is given to the memory card 67 without going through the image compression circuit 65 regardless of the area control system employed. Moreover, recording onto the memory card 67 is performed at a high speed under the control of the DMA controller, which is built into the control unit 68, with the exception of the header information. In this way, the amount of information recorded onto the memory card 67 becomes larger the less image encoding is performed, thereby varying the length of time and the timing at which that this recording is performed. However, no matter how this period and timing change, the processing for searching for the unrecorded area and writing the header information in the unrecorded area is performed concurrently with setup processing in advance of the start of recording. Thus, photographic speed is reliably increased.

Although the second embodiment of the present invention has been described with respect to a specific configuration, it will be recognized that the second embodiment is not limited to the specific configuration.

In accordance with a third preferred embodiment of the present invention, the area control system shown in FIG. 9 is employed in the storage area of the memory card 67 under the software executed by the control unit 51. With this type of area control system, files, which can be accessed through the MS-DOS file system, are formed in the image data area 92 and the control area 93. File organization for these files is the same as in the conventional example, so an explanation of it has been omitted.

The control unit 51 sets the FAT area to a status in which all of the chain data is canceled as it stores the parameters, which have been set in advance according to the file organization, in the boot sector area. With respect to the route directory area, the control unit 51 sets all of the directory entries to a status in which no files are registered. When the image data area is assigned to the code, generated from the image compression circuit 65, as the control unit 51 searches the route directory area for empty directory entries, it searches the FAT area for FAT entries in which no linking relationship is registered with any cluster. Thereafter, the control unit 51 writes the cluster number which corresponds to that FAT entry as the top cluster number of the corresponding directory entry, at time (8) in FIG. 4. Moreover, the control unit 51 generates header information relating to the corresponding frame and writes the header information into the empty cluster, at times (9) and (10) in FIG. 4.

The code generated by the image compression circuit 65 is written after the control unit 51 assigns the remaining area of the cluster by unit of the built-in DMA controller. When the cluster is full, the control unit 51 searches for another empty cluster, based on the chain information, and assigns the new cluster to subsequent code words. Thereafter, the control unit 51 registers information indicated by the theoretical connection between that cluster and previous clusters as chain information at time (11) in FIG. 4.

The operations in accordance with the third embodiment of the present invention from time (12) through (14), in FIG. 4, after the control unit 51 has recognized that the last word of the code of the corresponding frame has been stored in the image data area 92, are the same as set forth with respect to the conventional example.

By maintaining compatibility with the file organization and data terminals operated under MS-DOS, and implementing slight modifications in the software executed by the control unit 51, the search of the unrecorded area and the recording of header information into the found unrecorded area are completed in the period from the start of setup processing to when the information of one frame has been recorded into the frame memory 64. This reduces the required photography time.

Although the third embodiment of the present invention has been described with respect to a specific configuration, it will be recognized that the third embodiment is not limited to the specific configuration. For example, while the third embodiment has been described with respect to a film system which is compatible with MS-DOS is employed, the third embodiment of the present invention is not limited to this type of file system. Any file system with heap area control, which makes editing of the image signals possible for each frame regardless of the sequence of the photographed frames, is usable. For example, a file system which is compatible with UNIX or any other operating system may be employed.

Although a few preferred embodiments of the present invention have been shown and described, it would be appreciated by those skilled in the art that changes may be made in these embodiments without departing from the principles and spirit of the invention, the scope of which is defined in the claims and their equivalents.

In the conventional examples, the time required for searching the unrecorded area increases as the storage area of the memory card 67 increases. Particularly when the processing speed of the processor which is built into the control unit 51 is not fast enough, there is a possibility that searching will not be completed until processing for writing to the frame memory 64 is completed. However, in accordance with the preferred embodiments of the present invention, the search of the unrecorded area and the recording of header information is performed concurrently with the setup processing. Thus, the time required for photography of each frame is reliably shortened. Moreover, in accordance with the preferred embodiments of the present invention, processing for a search for the unrecorded area and writing the header information in that unrecorded area is performed concurrently with setup processing, but the present invention is not limited to this type of configuration. For example, it is possible to perform only searching for the unrecorded area concurrently with setup processing In each of the preferred embodiments of the present invention, the memory card 67 conforms to JEIDA standards, but the present invention is not limited to this type of storage medium. If the drop in photographic speed is held within the permissible range, any storage medium which can be inserted and removed may be used. Further, one of ordinary skill in the art will recognize that when there are autoexposure (AE) and autofocus (AF) functions, the controller 51 performs photographic operations concurrently with the processing for these functions.

By concurrently driving stages from the imaging section to the temporary storage unit 12, as well as the storage units 13 and 32, processing for searching for the free area of the storage units 13 and 32 and for storing the header information in that free area is performed concurrently during the period in which the code and the image signals of the corresponding frame are stored in the temporary storage unit 12. That is, the photographing of a frame is quickly performed under the control of the software, without changing the configuration of the hardware, so cost increases are controlled while performance is increased and the photographic operation is more Further, a storage area for each frame, which consists of a control area, in which control information is stored based on the specified area control system, and an image data area, in which code and image information are stored, may be formed in the storage unit. That is, the control information and the image information can be accessed based on separate addressing, so that area control processing efficiency increases, and photographic efficiency increases.

Moreover, a heap system may be employed as the area control system of the storage unit. Thus, even if the content of that storage unit is deleted or updated and dispersed in the address space to create a free area, that free area can be reliably and efficiently assigned to the code and image information of a newly photographed frame. That is, area control is performed by a system which is appropriate to the type operation of the digital still camera, so photographic efficiency is further increased.

In addition, a file control system which conforms to a desired file organization may be employed as the area control system. The storage area of the storage unit is configured as the file organization file. That is, a file system with which heap system area control is possible under the same operating system as that of the devices used in editing is employed. Thus, the exchange of image information among the devices is reliably performed, the image information is efficiently utilized, and it is possible to flexibly accommodate multimedia.

Optionally, an MS-DOS file system may be employed as the file system, so image information can be reliably exchanged among inexpensive, highly functional, personal computers which run under MS-DOS, in addition to many other types of data terminals. This promotes the efficient utilization of image information.

What is claimed is:

1. A digital still camera comprising:

an imaging unit which outputs image signals indicative of a frame of a subject;

a temporary storage unit which accumulates the image signals;

a storage unit having a storage area for the image signals, the storage area being organized by an area control system;

an area control unit which drives the imaging unit and the temporary storage unit for each frame and concurrently identifying a free storage area in the storage unit; and a recording control unit which records header information indicating a type of the image signals, said recording control unit recording the image signals accumulated in the temporary storage unit into the identified free storage area.

2. A digital still camera comprising:

an imaging unit which outputs image signals indicative of a frame of a subject;

a temporary storage unit which accumulates the image signals;

a storage unit having a storage area for the image signals, the storage area being organized by an area control system;

an area control unit which drives the imaging unit and the temporary storage unit for each frame and concurrently identifies a free storage area in the storage unit to record header information indicating a type of the image signals; and a recording control unit which records the image signals accumulated in the temporary storage unit into the identified free storage area adjacent to the header information.

3. A digital still camera comprising:

an imaging unit which outputs image signals indicative of a frame of a subject;

a temporary storage unit which accumulates the image signals;

an image encoding unit which encodes the image signals accumulated by the temporary storage unit and generates a code;

a storage unit having a storage area for the code, the storage area being organized by an area control system;

an area control unit which drives the imaging unit and the temporary storage unit for each frame and concurrently identifies a free storage area in the storage unit; and a recording control unit which records header information indicating a type of the image signals, said recording control unit storing the code into the identified free storage area.

4. A digital still camera comprising:

an imaging unit which outputs image signals indicative of a frame of a subject;

a temporary storage unit which accumulates the image signals;

an image encoding unit which encodes the image signals accumulated by the temporary storage unit and generates a code;

a storage unit having a storage area for the code, the storage area being organized by an area control system;

an area control unit which drives the imaging unit and the temporary storage unit for each frame and concurrently identifies a free storage area in the storage unit to record header information which indicates a type of the image signals; and a recording control unit which records the code into the identified free storage area adjacent to the header information.

5. A digital still camera, as set forth in claim 1, wherein a frame storage area for each frame is formed in the storage area, each frame storage area comprising a control area containing control information suitable to the area control system and an image data area containing the image signals.

6. A digital still camera, as set forth in claim 2, wherein a frame storage area for each frame is formed in the storage area, each frame storage area comprising a control area containing control information suitable to the area control system and an image data area containing the image signals.

7. A digital still camera, as set forth in claim 3, wherein a frame storage area for each frame is formed in the storage area, each frame storage area comprising a control area containing control information suitable to the area control system and an image data area containing the code.

8. A digital still camera, as set forth in claim 4, wherein a frame storage area for each frame is formed in the storage area, each frame storage area comprising a control area containing control information suitable to the area control system and an image data area containing the code.

9. A digital still camera, as set forth in claim 5, wherein the area control system comprises a heap system.

10. A digital still camera, as set forth in claim 6, wherein the area control system comprises a heap system.

11. A digital still camera, as set forth in claim 7, wherein the area control system comprises a heap system.

12. A digital still camera, as set forth in claim 8, wherein the area control system comprises a heap system.

13. A digital still camera, as set forth in claim 9, wherein the storage area is organized by a predetermined file organization and a file control system which conforms to the file organization.

14. A digital still camera, as set forth in claim 10, wherein the storage area is organized by a predetermined file organization and a file control system which conforms to the file organization.

15. A digital still camera, as set forth in claim 11, wherein the storage area is organized by a predetermined file organization and a file control system which conforms to the file organization.

16. A digital still camera, as set forth in claim 12, wherein the storage area is organized by a predetermined file organization and a file control system which conforms to the file organization.

17. A digital still camera, as set forth in claim 13, wherein the file organization is compatible with an MS-DOS file system and the file control system conforms to the MS-DOS file system.

18. A digital still camera, as set forth in claim 14, wherein the file organization is compatible with an MS-DOS file system and the file control system conforms to the MS-DOS file system.

19. A digital still camera, as set forth in claim 15, wherein the file organization is compatible with an MS-DOS file system and the file control system conforms to the MS-DOS file system.

20. A digital still camera, as set forth in claim 16, wherein the file organization is compatible with an MS-DOS file system and the file control system conforms to the MS-DOS file system.

* * * * *

UNITED STATES PATENT AND TRADEMARK OFFICE
CERTIFICATE OF CORRECTION

PATENT NO. : 5,581,311
DATED : December 3, 1996
INVENTOR(S) : Toshihisa KUROIWA

It is certified that error appears in the above-indentified patent and that said Letters Patent is hereby corrected as shown below:

Column 15, line 51, delete "identifying" and insert -- identifies --.

Signed and Sealed this

Eighth Day of April, 1997

Attest:

BRUCE LEHMAN

*Attesting Officer*  *Commissioner of Patents and Trademarks*